(12) United States Patent
Metz et al.

(10) Patent No.: US 8,774,372 B2
(45) Date of Patent: Jul. 8, 2014

(54) TELEPHONE CALL INBOX

(75) Inventors: Brent D. Metz, New York, NY (US);
Sean MacIsaac, New York, NY (US);
Kevin Caffrey, New York, NY (US);
Howard Lerman, New York, NY (US)

(73) Assignee: Felix Call, LLC, New York, NY (US)

( * ) Notice: Subject to any disclaimer, the term of this patent is extended or adjusted under 35 U.S.C. 154(b) by 457 days.

(21) Appl. No.: 12/726,932

(22) Filed: Mar. 18, 2010

(65) Prior Publication Data

US 2011/0026689 A1    Feb. 3, 2011

Related U.S. Application Data

(60) Provisional application No. 61/229,820, filed on Jul. 30, 2009.

(51) Int. Cl.
| | |
|---|---|
| *H04M 11/00* | (2006.01) |
| *H04M 3/22* | (2006.01) |
| *H04M 3/42* | (2006.01) |
| *G10L 17/00* | (2013.01) |
| *G10L 15/26* | (2006.01) |
| *H04M 3/51* | (2006.01) |

(52) U.S. Cl.
CPC ............ *G10L 15/265* (2013.01); *H04M 3/2218* (2013.01); *H04M 2203/551* (2013.01); *H04M 3/42221* (2013.01); *G10L 17/005* (2013.01); *H04M 3/51* (2013.01)
USPC ................ 379/88.14; 379/88.19; 379/100.08; 455/414.4; 455/415

(58) Field of Classification Search
USPC ...................... 379/88.01–88.04, 88.11–88.14, 379/88.19–88.21, 100.08, 144.07–145; 455/419, 412.2, 413, 414.4, 415; 348/211.99
See application file for complete search history.

(56) References Cited

U.S. PATENT DOCUMENTS

| 7,965,822 | B2 * | 6/2011 | Korah et al. ............... 379/88.03 |
| 8,000,452 | B2 * | 8/2011 | Watkins et al. ............ 379/88.02 |
| 2012/0094647 | A1 * | 4/2012 | Aftab et al. ................... 455/419 |

* cited by examiner

*Primary Examiner* — Md S Elahee
(74) *Attorney, Agent, or Firm* — Lowenstein Sandler LLP

(57) ABSTRACT

A system and method for extracting and presenting useful data from calls received by a client is disclosed. The resulting "telephone call inbox" is a way for a client view pay per call advertising as a stream of consumers with information available to understand the call activity of the consumers and for the client to navigate their call history. The system automatically filters non-consumer fraudulent calls, extracts the identity of a consumer, aggregates several calling entities into a single consumer, transcribes the call into a call stream using voice recognition software, extracts patterns and draws conclusions from the call stream, and presents a list of call streams in a user friendly set of web pages configured as the telephone call inbox. The telephone call inbox includes, for each call, the caller ID, one or more key words, phrases or major conclusions concerning the call, and the voice recognized call stream.

18 Claims, 9 Drawing Sheets

90 ⟶

Consumer Database

| Call | First Name | Last | Address | Phone Number | ... |
|---|---|---|---|---|---|
| 1 | Bob | Jones | 123 Main St. | (212) 456-1212 | ... |
| 2 | Cynthia | Brown | 20W. 63rd St. | (212) 555-1313 | ... |

Consumer to Call Match Database

| Call | Consumer |
|---|---|
| 1 | 1 |
| 2 | 1 |
| 3 | 2 |

Call Database

| Call | From | To | Length | ... |
|---|---|---|---|---|
| 1 | (212) 456-1212 | Client A | 30 s | ... |
| 2 | (212) 555-1313 | Client A | 4 min 15 s | ... |
| 3 | (973) 444-3333 | Client B | 15 s | ... |

Call Data Storage Database

| Call | Type | Offset | Length | Data |
|---|---|---|---|---|
| 2 | Word | 0:38 | 2 s | "appointment" |
| 2 | Word | 2:15 | 3 s | "cash" |
| 2 | Conclusion | - | - | Appointment Booked |

TELEPHONE CALL INBOX

CROSS-REFERENCE TO RELATED APPLICATIONS

This application claims the benefit of U.S. provisional patent application No. 61/229,820 filed Jul. 30, 2009, the disclosure of which is incorporated herein by reference in its entirety.

FIELD OF THE INVENTION

The present invention relates generally to telecommunications, and more particularly, to a method and system for creating an e-mail-like telephone call inbox of transcribed telephone calls between consumers and a business.

BACKGROUND OF THE INVENTION

When a business (hereinafter, the "client(s)") uses pay per call advertising, the client may receive a number of calls from consumers seeking their products or services, etc. When business is good, the number of calls may be overwhelming and too time intensive to monitor. What is desirable to monitor includes determining the number of consumers and extracting significant data from consumer interactions, such as the number and type of products sold, the state or phase of a complicated transaction, or the type of consumer that is interested in a particular product or service.

To keep track of telephone calls and their content (hereinafter, the "consumer(s)"), the client may subscribe to an audio recording and or transcription service. Unfortunately, if the client receives, for example, 30 phone calls a day, and playing the recorded phone messages takes on average five to ten minutes apiece (or a similar amount of time in transcribed form) it may take three hours to listen/read all of the calls, which becomes tedious. Moreover, the client may receive only the caller ID number and a short string identifying the name of the consumer on their telephone, which provides little information about the consumer. The client also needs to manually and mentally extract relevant information from each call, yet may have no tools for finding patterns in the calls that may affect their business.

Accordingly, what would be desirable, but has not yet been provided, is and method and system that simplifies the management of call streams from consumers to a client. The method and system would be capable of providing useful data extracted from the call streams that is presented to the client in a user-friendly form.

SUMMARY OF THE INVENTION

The above-described problems are addressed and a technical solution is achieved in the art by providing a method and system for extracting useful data from calls streams of consumers received by a client and presenting the data to the client in an e-mail-like "telephone call inbox." As used herein, the term "client" may refer to any person or organization that may employ the method and/or system of the present invention, which may include, but is not limited to, an individual, a non-profit organization such as a university, and a for-profit business. As used herein, the term "consumer" may refer to any person or organization that may call into the system using the method of the present invention, which may include, but is not limited to, an individual, a non-profit organization such as a university, and a for-profit business. When a call is received from a potential consumer at a telephony server, the telephony server completes the call to a client, bridges the call, and begins recording the call. The identity of at least one consumer calling a client is extracted from the call. As part of the identification process, non-consumer fraudulent call data is automatically filtered out of the call (stream). A call is transcribed into a text call stream by voice recognition software on both the consumer and the client sides of the call stream. The current transcribed call stream is aggregated with at least one other call stream into one or more consumer entities. Patterns may be extracted from a call stream and/or across a plurality of call streams to indicate noteworthy activity and higher level conclusions may be drawn based on the appearance of one or more specific tags.

The transcribed call stream, caller ID, and extracted pattern data are presented to a client in an e-mail-like "telephone call inbox." A first telephone call inbox screen lists each call per line, which includes a caller ID string, key phrases and/or extracted patterns that are relevant to the client, followed by a partial transcription of the call. To view the entire transcription; the client double clicks on the partial transcription. The client is presented with a second screen that includes a listing of the consumer, the client, the key word(s) or conclusion as a heading or subject, and a line-by-line transcription of the client/consumer conversation, with key words highlighted.

According to an embodiment of the present invention, a computer-implemented method for automatically extracting and presenting transcriptions of telephone calls from at least one consumer to a client is disclosed, comprising the steps of: extracting the identity of a caller from a call received by the client; transcribing the call; aggregating the identity of the caller into at least one consumer entity; extracting at least one pattern from the transcribed call; and distributing the at least one consumer entity and the at least one pattern to the client. The at least one consumer entity may a single consumer entity and the extracted identity is aggregated with at least one other identity of the same caller. At least one of the extracted identity and the other identity is based on at least one of a caller ID, a telephone number, and an identity found in the transcribed call. The call may be transcribed into at least a text-based call steam. Aggregating the identity of the caller into at least one consumer entity may further comprise aggregating a telephone number associated with the call with other telephone numbers associated with the at least one consumer such that multiple call streams are grouped as a single consumer entity.

According to an embodiment of the present invention, the at least one pattern may be extracted from at least one call to draw higher level conclusions to apply a tag to the at least one pattern based on the appearance of at least one of a word and phrase. The pattern may be extracted based on an industry-specific pattern set. The industry-specific pattern set may be relevant to a business associated with the client. The state of a call may be updated based on at least one of the at least one pattern and higher level conclusions.

According to an embodiment of the present invention, a content-based fraud detector rule set may be applied against the transcribed call to detect fraudulent calls. Alternatively, at least one of a telephone number and a caller ID associated with the call may be sent over the Internet to a Web site which maintains a record of customer complaints associated with the telephone number to detect fraudulent calls.

According to an embodiment of the present invention, the call may be transcribed into a text call stream on both the consumer and the client sides of the call along with an audio waveform of the call, one channel of the audio waveform being associated with the consumer and the other channel being associated with the client. The call may be transcribed using voice recognition software.

Data append services may be applied to at least one of a caller ID associated with the call and at least one phone number recognized during transcription of the call.

According to an embodiment of the present invention, distributing the at least one consumer entity and the at least one pattern to the client may further comprise distributing the transcribed call, caller ID, and extracted pattern data to the client in a formatted call log. The formatted call log may have the format of an e-mail-like telephone call inbox. A partial transcription of the call may be provided with the at least one pattern highlighted.

A Web server may receive a double clicks on the partial transcription from the client, causing a second screen to be transmitted to the client that includes a listing of the consumer entity, the client, the at least one pattern as a heading or subject, and a line-by-line transcription of a client/consumer conversation with key words highlighted.

BRIEF DESCRIPTION OF THE DRAWINGS

The present invention will be more readily understood from the detailed description of an exemplary embodiment presented below considered in conjunction with the attached drawings, of which:

FIG. 5A shows a consumer database table that lists the names and addresses of consumers associated with a client, according to an embodiment of the present invention;

FIG. 5B shows a consumer to call match database table which maps call streams to consumers, according to an embodiment of the present invention;

FIG. 5C shows a call database table that lists a high level summary of call streams to the client, according to an embodiment of the present invention;

FIG. 5D shows a call data storage database table that lists low level details a single call stream, according to an embodiment of the present invention.

It is to be understood that the attached drawings are for purposes of illustrating the concepts of the invention and may not be to scale.

DETAILED DESCRIPTION OF THE INVENTION

Figure 1:
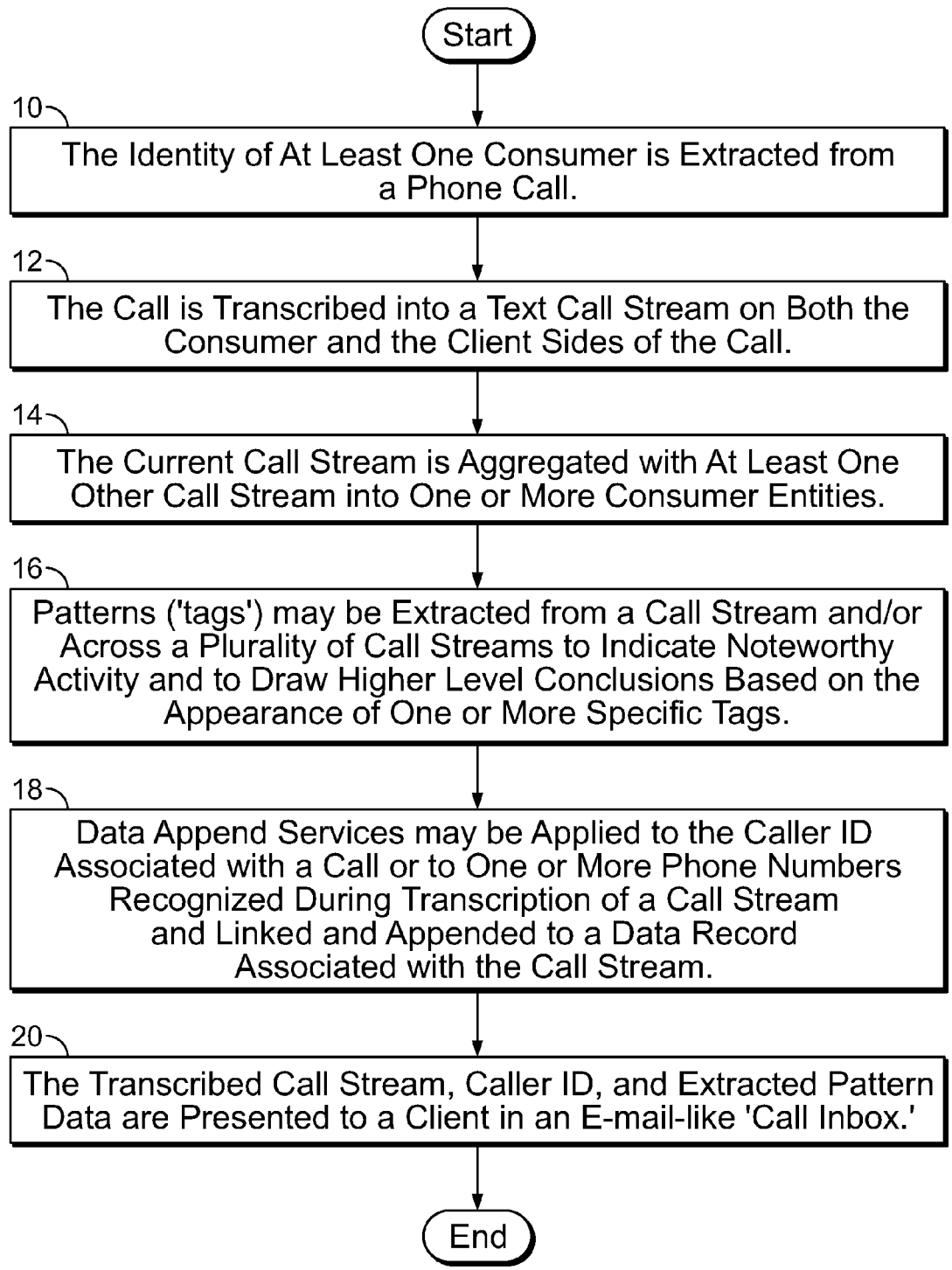
FIG. 1 is a process flow diagram illustrating exemplary steps for extracting and presenting transcriptions of call streams from consumers to a client in an e-mail-like telephone call inbox, according to an embodiment of the present invention.

FIG. 1 is a process flow diagram illustrating exemplary steps for extracting and presenting transcriptions of call streams from consumers to a client in an e-mail-like telephone call inbox, according to an embodiment of the present invention. At step 10, the identity of at least one consumer is extracted from a phone call. As part of the identification process, non-consumer fraudulent call data is automatically filtered out of the call. At step 12, the call is transcribed into a text call stream on both the consumer and the client sides of the call. The audio waveform of a call stream is stored, with one (e.g., the left) channel being associated with the consumer and the other (e.g., the right) channel being associated with the client. Each of the channels is transcribed separately with timing data stored. A client may receive more than one telephone call from the same consumer, but the consumer may be associated with more than one telephone number. For example, the consumer may call from their business telephone, their home telephone, their cell phone, etc. Therefore, at step 14, the current call stream may be aggregated with at least one other call stream into one or more consumer entities. Information on the identification of consumer entities is extracted and linked to a database of consumers. In this way, multiple call streams may be grouped as a single consumer entity in a data model. The aggregation of phone calls from a single consumer with different telephone numbers provides the client with a better understanding of the number of consumer entities with which the client is associated. At step 16, patterns ('tags') may be extracted from a call stream and/or across a plurality of call streams to indicate noteworthy activity and to draw higher level conclusions based on the appearance of one or more specific tags. For example, mentioning payment and the word 'appointment' may indicate the conclusion that an appointment was booked on a call. At step 18, data append services may be applied to the caller ID associated with a call or to one or more phone numbers recognized during transcription of a call stream and linked and appended to a data record associated with the call stream. Data collected from a data append service may include the first and last name and billing address of the telephone number captured. At step 20, the transcribed call stream, caller ID, and extracted pattern data are presented to a client in an e-mail-like "telephone call inbox."

Figure 2:
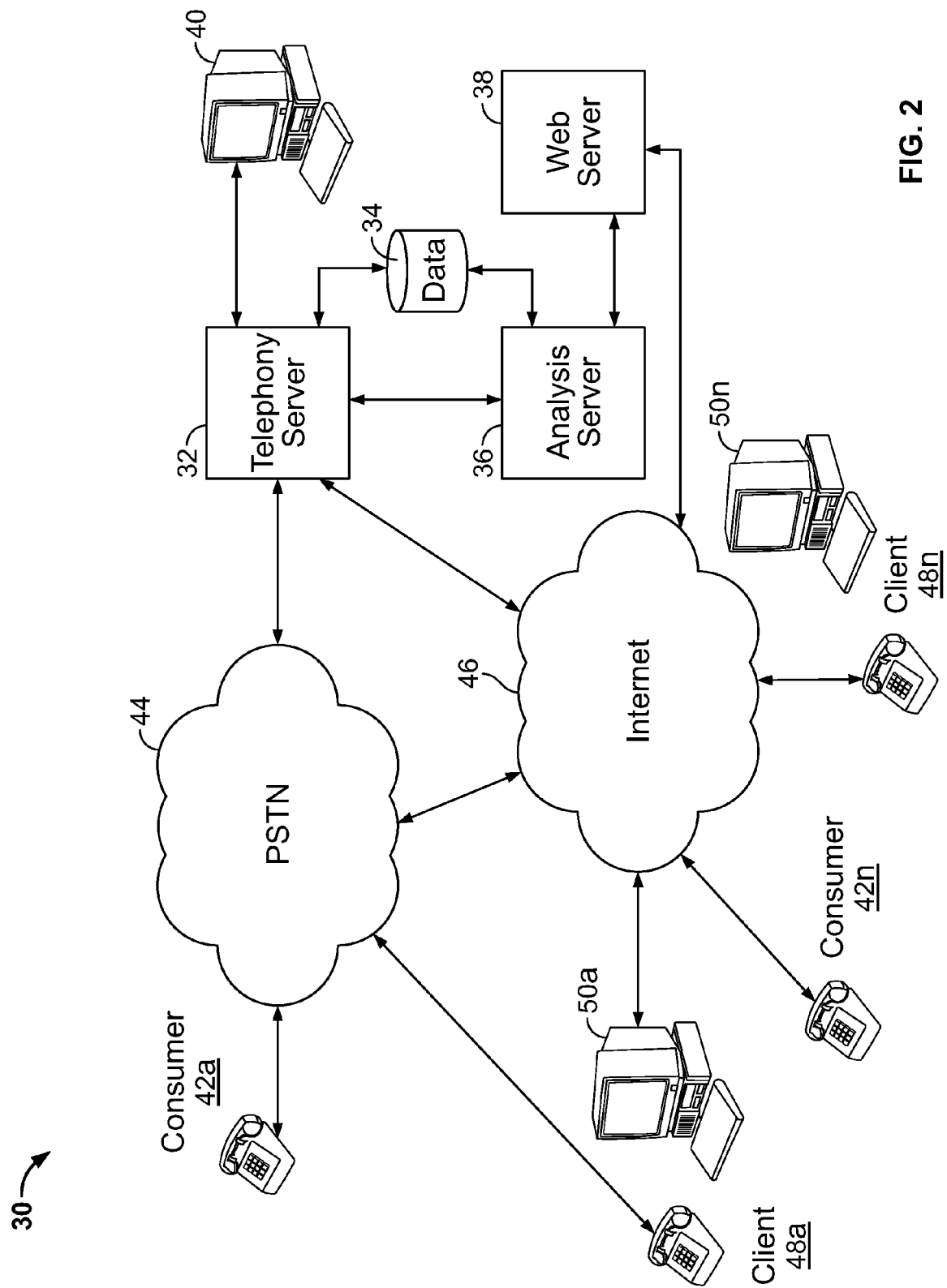
FIG. 2 depicts a system for extracting and presenting transcriptions of call streams from consumers to a client in an e-mail-like telephone call inbox, according to an embodiment of the present invention.

FIG. 2 depicts a system 30 for extracting and presenting transcriptions of call streams from consumers to a client in an e-mail-like telephone call inbox, according to an embodiment of the present invention. The system 30 includes a telephony server 32, the telephony server 32 being associated with a data store 34, an analysis server 36, a web server 38, and a data entry terminal/computer 40. The telephony server 32 may be a traditional private branch exchange (PBX) or a voice-over-IP (VOIP) server. The telephony server 32 may be configured for intercepting calls from consumers 42a-42n via the public switched telephone network (PSTN) 44, the Internet 46, or both; for completing those calls to clients 48a-48n over the PSTN 44, the Internet 46, or both; for bridging calls between the consumers 42a-42n and the clients 48a-48n, for extracting caller IDs belonging to the consumers 42a-42n, for recording telephone calls received by the clients 48a-48n; and for logging the recorded calls and the caller IDs to the data store 34. The analysis server 36 may be configured for transcribing received telephone calls into voice-recognized text call streams and converting caller IDs to physical names and addresses of the consumers 42a-42n either from information associated with the PSTN 44, information extracted from web sites located on the Internet 46 and/or the telephony server 32, or information extracted from the call streams. The analysis server 36 may be further configured for analyzing and extracting patterns within and among the call streams to produce key words or phrases that are relevant to a client 48a-48n, such as completing the pattern tagging of calls and aggregation of calls into consumer entities as described in steps 14-18 of FIG. 1 above. The data store 34 stores a number of tables needed for analysis and for storing and the retrieval of call streams to be described in connection with FIGS. 5A-5D hereinbelow. A domain analyst may enter typical key word patterns to be extracted from calls manually via the data entry terminal/computer 40. Alternatively, key word patterns may be provided by third party software. The web server 38 is configured for presenting analyzed call streams comprising grouped consumers to the clients 48a-48n in the form of formatted call logs and telephone call inboxes to be described hereinbelow in connection with FIGS. 3 and 4, respectively. The telephony server 32, the analysis server 36, and the web server 38 may each comprise at least one processor, which may be included in a personal computer, a work station, a mainframe computer, or any other device having enough processing power for carrying out the present invention. Alternatively, one or more of the servers/computers 32, 36, 38 may be aggregated into one or more processors running on a single personal computer, a work station, or a mainframe computer.

Each of the clients 48a-48n may have a voice line or VOIP telephone 48a-48n configured to receive inbound calls via the telephony server 32. Each of the clients 48a-48n may have one or more terminals/personal computer/workstations 50a-50n for logging into the web server 38 in order to view their telephone call inbox. The client 48a may communicate with a consumers 42a over the PSTN 44 if the telephony server 32 is a PBX, the client 48a have a voice line phone, and the consumer 48a has a voice line phone; over the Internet 46 and the PSTN 44 if the telephony server 32 is a VOIP server, the client 48n has a VOIP phone, and the consumer 42a has a voice line phone; and, over the Internet 46 if the telephony server 32 is a VOIP server and the client 48n has a VOW phone.

Figure 3:
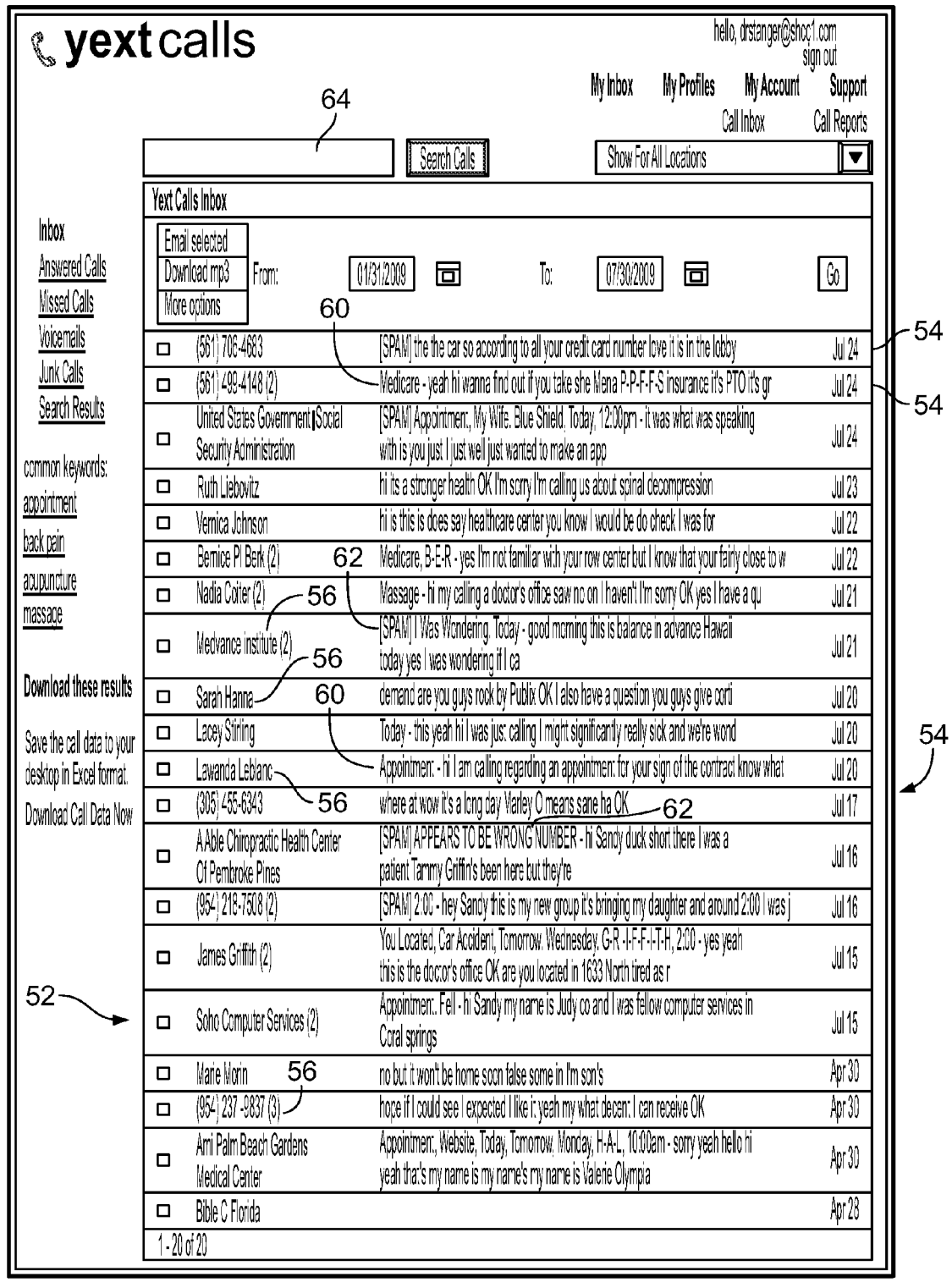
FIG. 3 is a screen shot of a formatted telephone call inbox web page, according to an embodiment of the present invention.

FIG. 3 is a screen shot of a formatted telephone call inbox 52, according to an embodiment of the present invention. When a client 48a enters a URL corresponding to the Web server 38, the client 48a is presented with a user login screen (not shown) which prompts the client 48a to enter a login and password. Once logged in, the client 48a is directed to the formatted telephone call inbox 52 assigned to the client 48a, which displays call listings from the consumers 42a-42n. The formatted telephone call inbox 52 contains a plurality of call entries 54. Each of the call entries 54 includes a consumer name field 56, which may be a personal name, a company name, or a telephone number. The consumer name field 56 may be extracted either from the caller ID, a third party name service, or from the call stream itself and is described in greater detail hereinbelow in connection with FIG. 6. Each of the call entries 54 also includes key words or tags 60, which may include words or phrases of importance extracted from the call stream and which are significant to the business of the client 48a to be described in greater detail hereinbelow in connection with FIG. 6. Key words or tags 62 may also indicate a wrong or non-legitimate telephone number/call. A freeform transcription search box 64 permits filtering of the call entries 54 so as to display only those call entries 54 that contain entered key word(s) or consumer name fields 56.

Figure 4:
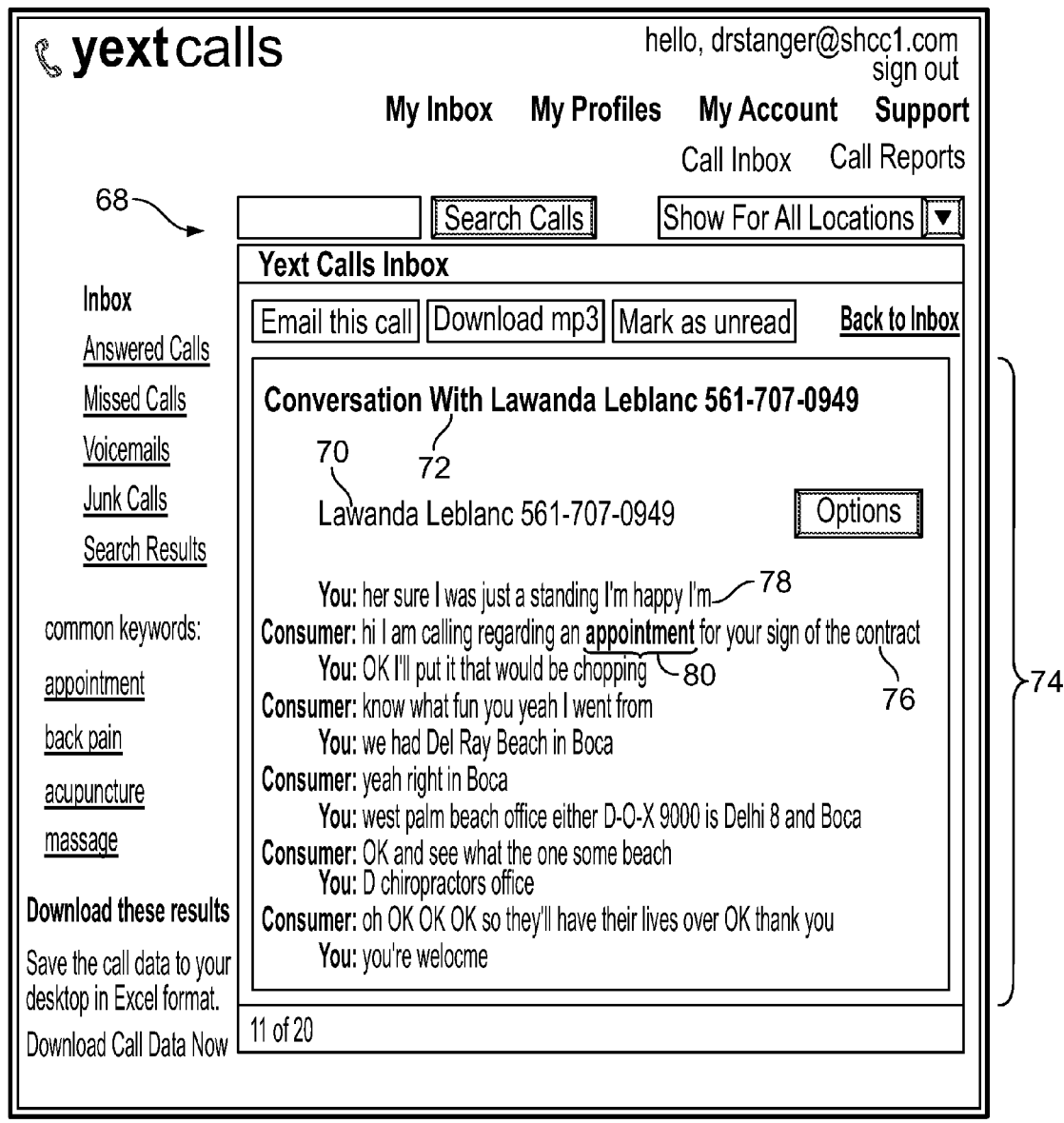
FIG. 4 is a screen shot of a second telephone call inbox web page displayed when a client double clicks on a specific call stream of the formatted telephone call inbox screen displayed in FIG. 3.

FIG. 4 is a screen shot of a second call screen 68 that is displayed when the client 48a double clicks on a specific call entry 54 in the formatted telephone call inbox 52 of FIG. 3. Referring now to FIGS. 3 and 4, the call screen 68 displays many of the same types of fields common to e-mail programs. A field 70 is populated by the consumer name field 56, which may also include the calling telephone number. A field 72 is populated by the name of the client 48a and a telephone number. The message body 74 includes the transcription of the specific call, with alternating portions 76, 78 being a transcription of the client and consumer portions of the call stream, respectively. Key words or phrases 80 may be highlighted in the call stream FIGS. 5A-5D show examples of tables located in the data store 34 for processing calls and the telephone call inboxes, according to an embodiment of the present invention. In FIG. 5A, a consumer database table 90 includes a plurality of records 92. Each of the records 92 corresponds to one of the consumers 42a-42n associated with a client 48a-48n and is derived from incoming phone calls. Each of the records 92 contains fields for at least an arbitrarily assigned consumer number 93, the first name 94, the last name 96, the street address 98, and the telephone number 100 associated with a consumer 42a-42n, the street address being derived by methods to be described in connection with FIG. 6 hereinbelow. It should be noted that the same client may have more than one record 92 corresponding to different telephone numbers 100 and street addresses 98.

In FIG. 5B, a consumer to call match database table 102 maps call streams 104 to consumers 106. The designation for a call stream 104 is a numerical value assigned in increasing order as calls are received. The designation for a consumer 106 corresponds to the consumer number 93 of FIG. 5A. As shown in FIG. 5B, there may be several call streams 104 associated with the same consumer 106.

In FIG. 5C, a call database table 108 lists a high level summary of a call stream. Each record 110 in the call database table 108 includes at least a call ID number 112 corresponding to the designation for a call stream 104 of FIG. 5B, a "From" field 114 indicating the telephone number of one of the consumers 42a-42n or an invalid caller ID, a "To" field 116 corresponding to one of the clients 48a-48n, and a "length" field 118 indicating the length of time of the call corresponding to the call stream.

In FIG. 5D, a call data storage database table 120 lists low level details of each call stream associated with each client. The call data storage database table 120 lists, for each call stream, information concerning key words and phrases and the extracted pattern found in the call stream along with time stamps and pattern types. Each record includes at least a call ID number 124 corresponding to the designation for a call stream 104 of FIG. 5B, a type field 126 listing the type of extracted key word or phrase, an offset field 128 indicating the relative time position in the call stream at which the key word or conclusion occurred, a length field 130 indicating the time length corresponding to the length of time needed to utter the key word or phrase, and a data field 132 listing the key word, phrase, or conclusion.

Figure 6:
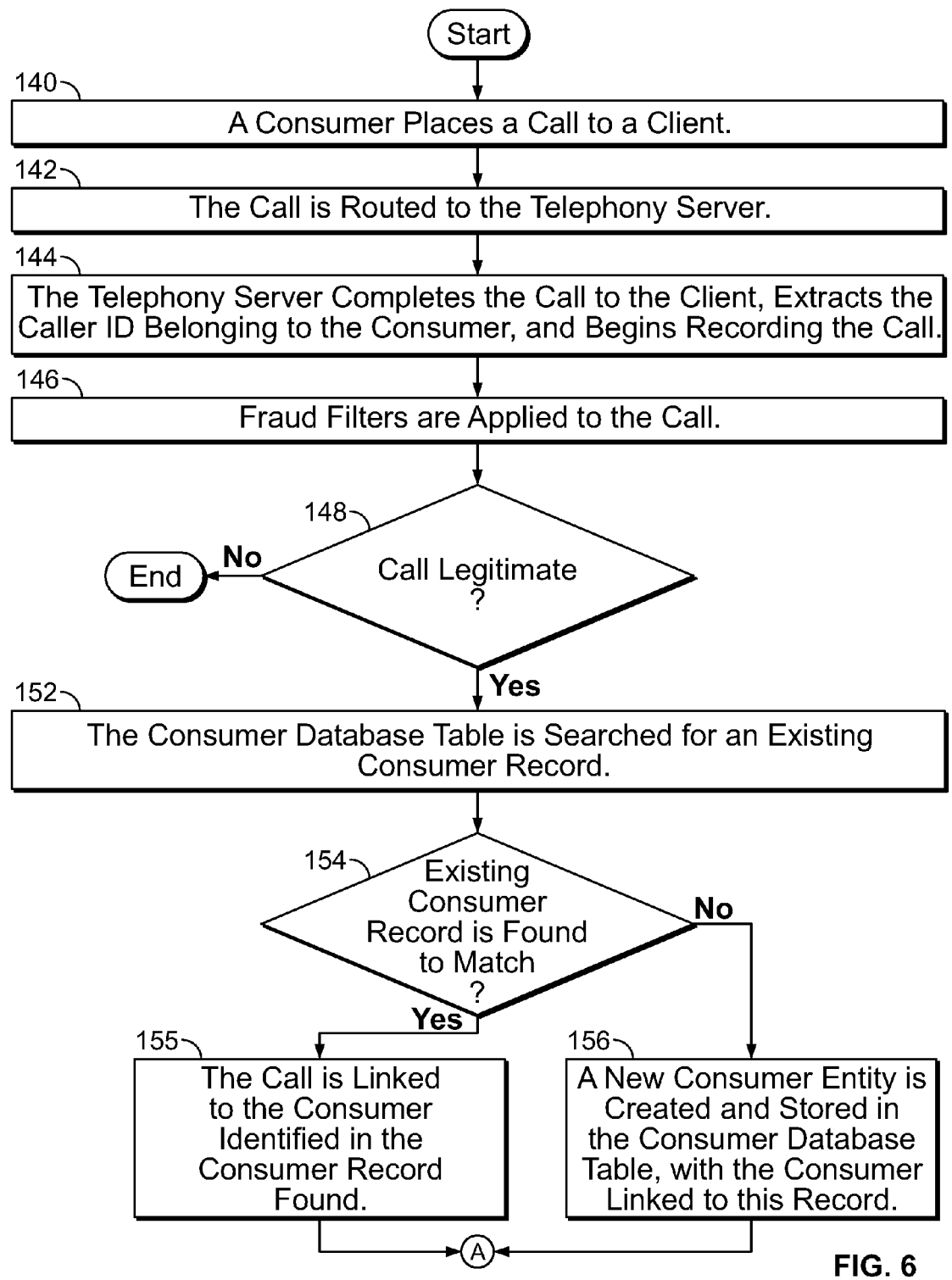
FIG. 6 is a process flow diagram illustrating the exemplary steps of FIG. 1 in greater detail, according to an embodiment of the present invention.
Figure 6:
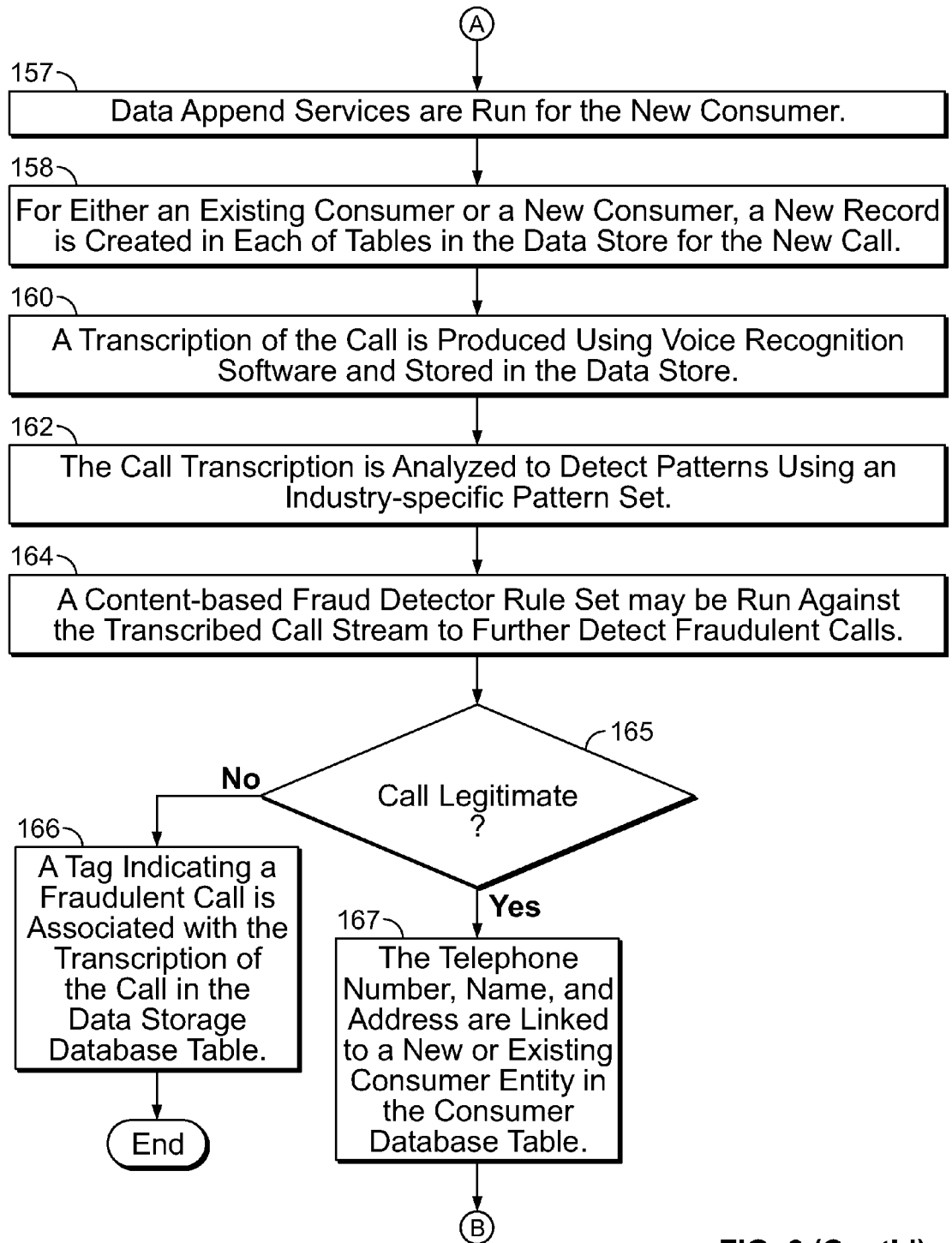
Figure 6:
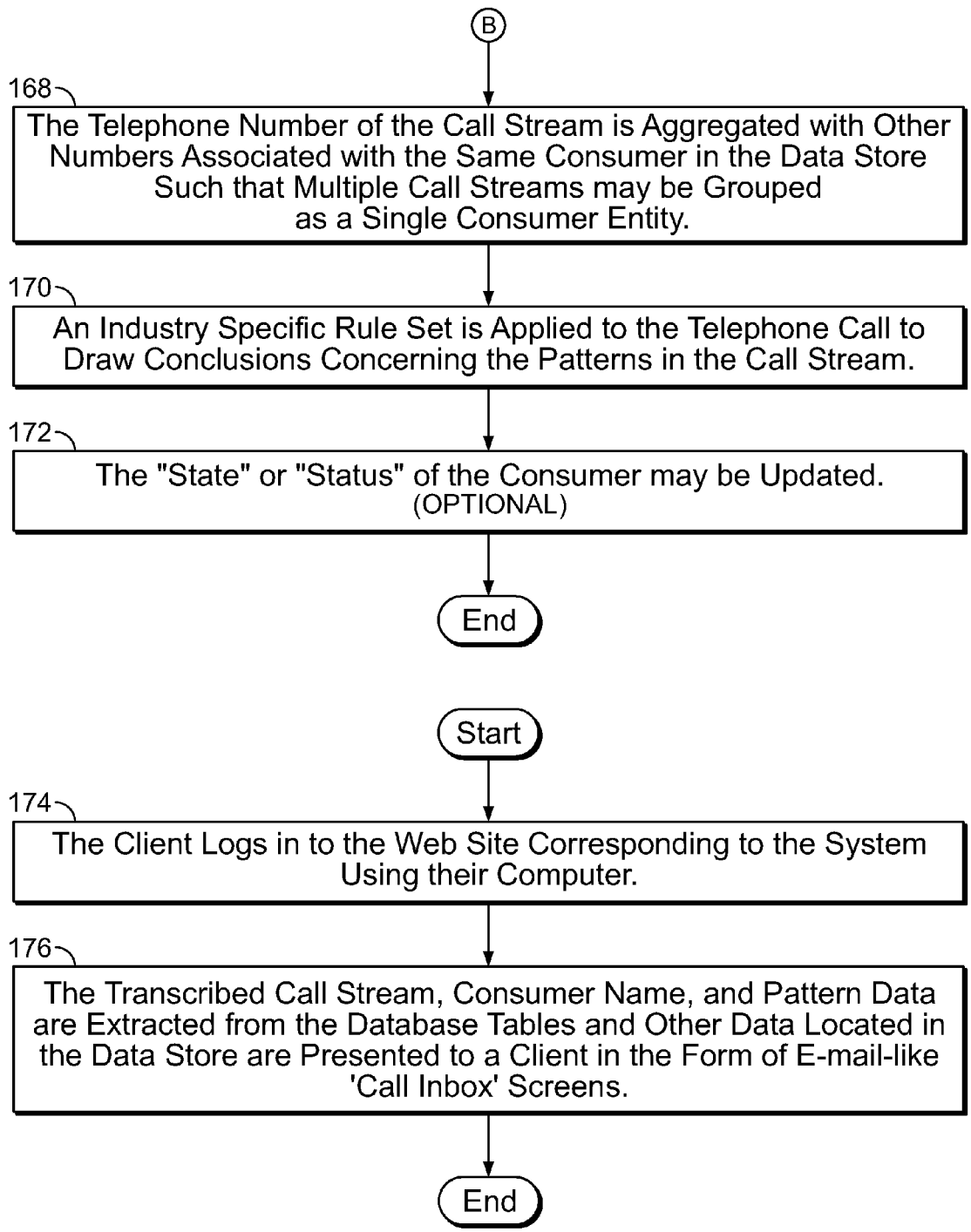

FIG. 6 is a process flow diagram illustrating the exemplary steps of FIG. 1 in greater detail. Although FIG. 2 indicates several scenarios for interaction between the consumers 42a-42n and the clients 48a-48n, for illustrative purposes, the following example shows interactions in which a client 48a has a VOIP telephone for communicating with a consumer 42a that has voice line phone.

Referring now to FIGS. 1, 2, 5A-5D, and 6, at step 140, a consumer 42a places a call to a client 48a. At step 142, the PSTN 44 and Internet 46 route the call to the telephony server 32. According to an embodiment of the present invention, the PSTN 44 via the Internet 46 rings a telephone number assigned to the telephony server 32 on behalf of the client 48a. As described above, at step 144, the telephony server 32 completes the call to the client 48a over the Internet 46, bridges the call, extracts the caller ID belonging to the consumer 42a, and immediately begins recording the call even before the client 48a answers their telephone. Immediate recording is one method for detecting fraudulent calls, as a recoded telemarketing call may begin playing as soon as a receiving telephone is rung. The call is recorded on two channels, with one (e.g., the left) channel being associated with the consumer 42a and the other (e.g., the right) channel being associated with the client 48a.

At step 146, fraud filters are applied to the call. The fraud filters may match the extracted caller ID against a database of known telemarketers. Additional rules are applied to detect fraudulent calls via phrases uttered in the call stream associated with the transcribed call to be discussed hereinbelow, or a signal indicating a fax machine. If, at step 148, the fraud filters indicate a fraudulent call, then further processing terminates.

If, at step 148, the call is deemed to be legitimate, then at step 152, the consumer database table 90 of FIG. 5A is searched for an existing consumer record. All of the fields of a record need to match an existing consumer. A first name, last name, and street address are derived from the caller ID of an incoming call based on techniques to be described hereinbelow and compared to the first name 94, the last name 96, and the street address 98 of each record 92 in the consumer database table 90. The name and street address information derived from the caller ID of the incoming call may be derived from a number of sources. One source is Calling Name Delivery (CNAM) associated with a call that is located within the in-band signaling information within the call, which is a 15 digit name string. Other methods for obtaining name and address information are by consulting third party services such as Acxiom, InfoUSA and/or Accudata. Still other methods may include matching census collected common first and last names in a database available on the Internet 46 to a name that is partially truncated in the CNAM. If no name and address is matched, then the telephone number of the consumer 48a is displayed in the telephone call inbox depicted in FIGS. 3 and 4.

If, at step 154, an existing consumer record is found to match in the consumer database table 90, then at step 155, the call is linked to the consumer identified in the consumer record found. If, at step 154, no existing consumer record is found to match the data in the incoming call, then at step 156, a new consumer entity is created and stored in the consumer database table 90, with the consumer linked to this record. At step 157, data append services are run for the new consumer. At step 158, for either an existing consumer or a new consumer, a new record is created in each of tables 102, 108, and 120 for the new call.

At step 160, a transcription of the call between the client 48a and the consumer 42a is produced using voice recognition software and stored in the data store 34 along with the recording of the call, preferably in MP3 format. At step 162, the call transcription is analyzed in real time or near real time to detect patterns using an industry-specific pattern set for the purpose of deriving the tags described above. The pattern set against which portions of the call are matched is provided by third party software or manually by a domain expert. The industry-specific set of patterns is relevant to the business associated with the client 48a, such as information pertaining to chiropractors or automotive repair shops, etc. Some patterns may be extracted that are independent of an industry, such as the consumer's telephone number, which may be then be substituted in the consumer database table 90 for an existing telephone number if the consumer 42a called from a general number and the phone number mentioned in the call is a direct number (e.g., 973-515-2143 substituted for 973-515-2000).

At step 164, a content-based fraud detector rule set may be run against the transcribed call stream to further detect fraudulent calls, including patterns detected such as the word "sorry" or "wrong number." If the time codes of the call recorded in table 120 indicate that during, say, the first 15 seconds of the call, the consumer 42a speaks continuously without the client 48a being allowed to speak, then this may be interpreted by the fraud detector as a sign of a telemarketer. Other pattern phrases in the call may be detected as fraudulent, such as "looking for a way out of credit card debt." Alternatively, the telephone number or caller ID may be sent over the Internet 46 to a web site which maintains a record of customer complaints associated with the telephone number, which may be employed as another means of detecting fraudulent telephone calls. If, at step 165, the fraud filters indicate a fraudulent call, then at step 166, a tag indicating a fraudulent call is associated with the transcription of the call in the data storage database table 120.

If, at step 165, the fraud filters indicate a valid call, then at step 167, the telephone number, name, and address are linked to a new or existing consumer entity in the consumer database table 90. At step 168, the telephone number of the call stream is aggregated with other numbers associated with the same consumer 42a in the data store 34 such that multiple call streams may be grouped as a single consumer entity in the tables 90, 102, 108, of FIGS. 5A-5C, respectively. This permits aggregate information to be determined and linked (e.g., 'what is the current status of this caller to this single client?', 'what is the current status of this caller across all clients?'). The linkage is typically created by linking a name and address of the consumer 42a in the consumer database table 90 to one or more phone numbers found in a caller ID or spoken aloud and extracted from the call transcription. As a result, a single name entity is displayed in the telephone call inbox of FIGS. 3 and 4 for all telephone numbers associated with the name entity.

At step 170, an industry specific rule set is applied to the telephone call to draw conclusions concerning the patterns in the call stream. The industry specific rule set is provided by third party software or manually by a domain expert. A sample conclusion that may be drawn from a call stream is that the client 42a wishes to make an "appointment" to meet with the client 48a. Another type of conclusion may be drawn by comparing patterns in a current call stream to patterns in other calls streams stored in the data store 34 from the same client 42a or across all clients 42a-42n, so as to draw conclusions concerning, for example, total call volume per month for a given consumer 42a. The pattern words or conclusions may be appended to the beginning of the transcription of the call stream in BOLD in the call entry 54 for the call as depicted in FIGS. 3 and 4 and added as "type" and/or "data" entries in the call data storage database table 120 of FIG. 5D. For example, a conclusion may be made in a "type" field for call number 2 for client 48a and consumer 42a which states that "an appointment was booked."

At optional step 172, the "state" or "status" of the consumer 42a may be updated. For example, the state of calls for a consumer 42a may be regarded as passing through stages of a buying cycle. The first state may be reached after receiving a first call having a pattern that indicated "wanting to book an appointment" with the client 48a. The second state may be reached when the pattern "doctor available" is detected. The third state may be reached when the pattern "appointment booked" is detected. The fourth state may be reached when the pattern "reschedule an appointment" is detected. The final state may be reached and noted in the data store 34 when the pattern "cancelled appointment" is detected. Thus, a "state"

of a single consumer is tracked across a plurality of calls based on conclusions drawn on each call. Processing terminates.

A new process begins when, at step 174, the client logs in to the web site corresponding to the system 30 using their computer 50*a*. Upon a successful login, at step 176, the transcribed call stream, consumer name, and pattern data are extracted from tables 90, 102, 108, and 120 and other data located in the data store 34 are presented to a client in the form of the e-mail-like telephone call inbox screens 52, 68 described above in connection with FIGS. 3 and 4, respectively. It would be appreciated by those skilled in the art that several programming techniques may be used for presenting the data in the tables 90, 102, 108, 120 in the format of the telephone call inbox screens 52, 68.

The telephone inbox screens 52, 68 provide advantages over existing transcription services. The client gains a deeper understanding of their consumer base to allow the client to plan inventories, track their business volume and revenues, etc. The client can filter invalid consumers from valid consumers. A client can better instruct executive assistants as to which consumers are of higher versus lower priority. The time needed for reviewing call transcriptions is greatly reduced. In this way, telephone call inboxes provides the client with a tool for increasing efficiency and reducing operating costs.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method, comprising:
   receiving, by a processor, a first call from a consumer to a client;
   transcribing, by the processor, voice data of the consumer of the first call into first transcribed text of the first call;
   extracting, by the processor, first identification data of the consumer from the first transcribed text of the first call;
   determining, by the processor, whether the first identification data of the consumer matches second identification data of the consumer extracted from second transcribed text of a second call of the consumer;
   when the first identification data does not match the second identification data,
      linking, by the processor, the first identification data and the first transcribed text of the first call with a new consumer entity and
      transmitting, by the processor, an inbox over a network for display to the client, the inbox comprising data associated with the new consumer entity comprising an identifier of the new consumer entity and a first partial transcription of the first call; and
   when the first identification matches the second identification data,
      linking, by the processor, the first identification data and the first transcribed text of the first call with an existing consumer entity corresponding to the second call of the consumer,
      aggregating, by the processor, the first identification data and the first transcribed text of the first call with the second identification data and the second transcribed text of the second call of the consumer, and
      transmitting, by the processor, an inbox over a network for display to the client, the inbox comprising an identifier of the existing consumer entity, the partial transcription of the first call, and a second partial transcription of the second call extracting a pattern from the first transcribed text of the first call and transmitting the pattern to the client; and
   associating a tag with the first transcribed text of the first call, wherein the tag is indicating a type of a call.

2. The method of claim 1, further comprising:
   drawing a conclusion from the pattern to apply the tag to the transcribed text of the first call in view of an appearance of at least one of a word or a phrase in the transcribed text of the first call;
   transmitting the tag to the client.

3. The method of claim 2, wherein the pattern is extracted based on an industry-specific pattern set.

4. The method of claim 2, wherein the industry-specific pattern set is relevant to a business associated with the client.

5. The method of claim 2, further comprising updating the state of a call as displayed by the client based on the pattern.

6. The method of claim 2, further comprising:
   receiving a selection on the partial transcription of the first transcribed text of the first call; and
   distributing a call screen to the client that includes a listing of the new consumer entity or the existing consumer entity, the client, the at least one pattern as a heading or subject, and a line-by-line transcription of a client/consumer conversation with key words highlighted.

7. The method of claim 1, wherein the first call is transcribed into a text call stream on both the consumer and the client sides of the first call along with an audio waveform of the first call, one channel of the audio waveform being associated with the consumer and the other channel being associated with the client.

8. The method of claim 7, wherein the first call is transcribed using voice recognition software.

9. The method of claim 1, further comprising applying data append services to at least one of a caller ID associated with the first call and at least one phone number recognized during transcription of the first call.

10. The method of claim 1, further comprising: receiving login information from the client, wherein the inbox is only transmitted upon successful login by the client.

11. The method of claim 1, wherein the transcribed text of the first call includes a conversation with lines transcribed from voice data at the consumer alternated by lines transcribed from voice data from the client.

12. The method of claim 1, further comprising applying a content-based fraud detector rule set against the transcribed text of the first call to detect fraudulent calls.

13. The method of claim 1, further comprising:
   sending at least one of a telephone number and a caller ID associated with the first call over the Internet to a web site which maintains a record of customer complaints associated with the telephone number to detect fraudulent calls.

14. A system, comprising:
   a memory;
   a processor, coupled to the memory, the processor to:
      receive a first call from a consumer to a client;
      transcribe voice data of the consumer of the first call into first transcribed text of the first call;
      extract first identification data of the consumer from the first transcribed text of the first call;
      determine whether the first identification data of the consumer matches second identification data of the consumer extracted from second transcribed text of a second call of the consumer;

when the first identification data does not match the second identification data,
- link the first identification data and the first transcribed text of the first call with a new consumer entity and
- transmit an inbox over a network for display to the client, the inbox comprising data associated with the new consumer entity comprising an identifier of the new consumer entity and a first partial transcription of the first call; and when the first identification matches the second identification data,
- link the first identification data and the first transcribed text of the first call with an existing consumer entity corresponding to the second call of the consumer,
- aggregate the first identification data and the first transcribed text of the first call with the second identification data and the second transcribed text of the second call of the consumer, and
- transmit an inbox over a network for display to the client, the inbox comprising an identifier of the existing consumer entity, the partial transcription of the first call, and a second partial transcription of the second call extracting a pattern from the first transcribed text of the first call and transmitting the pattern to the client; and
- associating a tag with the first transcribed text of the first call, wherein the tag is indicating a type of a call.

15. The system of claim 14, further comprising:
drawing a conclusion from the pattern to apply the tag to the transcribed text of the first call in view of an appearance of at least one of a word or a phrase in the transcribed text of the first call;
and
transmitting the tag to the client.

16. The system of claim 14, wherein the web server is further configured for receiving login information from the client, wherein the inbox is only transmitted upon successful login by the client.

17. The system of claim 14, wherein the transcribed text of the first call includes a conversation with lines transcribed from voice data at the a consumer alternated by lines transcribed from voice data from the client.

18. The system of claim 14, further comprising:
receiving a selection on the partial transcription of the first transcribed text of the first call; and
distributing a call screen to the client that includes a listing of the new consumer entity or the existing consumer entity, the client, the at least one pattern as a heading or subject, and a line-by-line transcription of a client/consumer conversation with key words highlighted.

* * * * *